US006789527B2

(12) United States Patent
Sauler et al.

(10) Patent No.: US 6,789,527 B2
(45) Date of Patent: Sep. 14, 2004

(54) METHOD FOR ADAPTIVELY CONTROLLING KNOCKING OF A GASOLINE DIRECT FUEL INJECTION INTERNAL COMBUSTION ENGINE, AND A CORRESPONDING DEVICE

(75) Inventors: Juergen Sauler, Stuttgart (DE); Axel Heinstein, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,595

(22) PCT Filed: Aug. 2, 2001

(86) PCT No.: PCT/DE01/02945

§ 371 (c)(1),
(2), (4) Date: Jul. 22, 2003

(87) PCT Pub. No.: WO02/20981

PCT Pub. Date: Mar. 14, 2002

(65) Prior Publication Data

US 2004/0011330 A1 Jan. 22, 2004

(30) Foreign Application Priority Data

Sep. 4, 2000 (DE) ......................... 100 43 694

(51) Int. Cl.$^7$ ................................. F02P 5/00
(52) U.S. Cl. ................................. 123/406.21
(58) Field of Search ................ 123/406.11, 406.21, 123/406.12, 406.16, 406.37, 406.34, 406.29, 594

(56) References Cited

U.S. PATENT DOCUMENTS

| 5,295,466 A | | 3/1994 | Fukui et al. | |
|---|---|---|---|---|
| 5,771,862 A | * | 6/1998 | Unland et al. | 123/406.33 |
| 6,062,199 A | * | 5/2000 | Entenmann et al. | 123/406.21 |

FOREIGN PATENT DOCUMENTS

| DE | 41 09 430 | 9/1992 |
|---|---|---|
| DE | 195 32 504 | 3/1997 |

* cited by examiner

Primary Examiner—Bibhu Mohanty
(74) Attorney, Agent, or Firm—Kenyon & Kenyon

(57) ABSTRACT

A method of adaptive knock control and a corresponding device for a direct-gasoline-injection internal combustion engine are described, the internal combustion engine being operated in at least two operating modes, the at least two operating modes differing by the status of at least one operating variable and/or at least one basic model concept. For knock control, relevant retardation angles of the firing angle are calculated by using an adaptable computation specification or they are stored in the adaptive engine characteristics map and read out of the adaptive engine characteristics map, the adaptive engine characteristics map being subdivided into ranges for at least one operating parameter, a retardation angle being assigned to each range. For the at least two operating modes, a separate adaptive engine characteristics map or a separate adaptable computation specification is provided, and when the operating mode changes, the instantaneous retardation angle is read out of the adaptive engine characteristics map of the new operating mode or is calculated by using the new adaptable computation specification.

8 Claims, No Drawings

METHOD FOR ADAPTIVELY CONTROLLING KNOCKING OF A GASOLINE DIRECT FUEL INJECTION INTERNAL COMBUSTION ENGINE, AND A CORRESPONDING DEVICE

FIELD OF THE INVENTION

The present invention is directed to a method of adaptive knock control of an internal combustion engine and a corresponding device for performing the method of adaptive knock control.

BACKGROUND INFORMATION

There are already known internal combustion engines that operate with direct gasoline injection. For operation of these internal combustion engines, a distinction is made between operating modes such as homogeneous operation and stratified charge operation or homogeneous lean operation. In addition, a method and a corresponding device for adaptive knock control are known from published German Patent Application 195 32 504, where relevant firing angle retardation angles for knock control are stored in an adaptive engine characteristics map upon leaving an adaptive engine characteristics map range and are read out of the adaptive engine characteristics map under certain conditions. For the load operating parameter or the rotational speed operating parameter, the adaptive engine characteristics map is subdivided into ranges, each of which is assigned a firing angle retardation angle.

SUMMARY

According an embodiment of the present invention an overwriting of the retardation angle of the adaptive engine characteristics map occurs during a change in operating modes and, due to the fact that the retardation values are read out of the specific engine characteristics map, the occurrence of unnecessary knocking or excessive retardation is prevented.

Six operating modes are currently differentiated and may also be differentiated to advantage with respect to adaptive knock control. In addition, the load and/or the rotational speed are selected as operating parameters on which the adaptive engine characteristics map values depend, because the firing angle and thus also the retardation angle are influenced primarily by these parameters. The adaptive engine characteristics maps are individually provided for each cylinder.

DETAILED DESCRIPTION

Knocking, i.e., an abnormal combustion process in the combustion chamber of an internal combustion engine, limits the power and efficiency and results in damage to the combustion chamber due to the high flame speeds. To prevent this, systems for knock detection and knock control are integrated into modern engines. Such systems are adequately well known from the literature, so their functioning will only be summarized briefly below.

Signals from the combustion chamber are detected by knock sensors belonging to the knock detection system and are relayed to an analyzing unit which also belongs to the knock detection system. Such signals may be, for example, acoustic signals, electromagnetic signals, electric signals, pressure signals, or temperature signals picked up by the knock sensors inside or outside of the combustion chamber.

The analyzing unit amplifies the signals and integrates them in a suitable manner, so that after an analog/digital conversion of the signals, the integrated value may be compared with a threshold value in a microprocessor in the engine, knocking being detected when the threshold value is exceeded. For example, a selection of a certain frequency band and/or a selection with respect to a certain time window is also made in the analyzing unit to suppress interference signals, the frequency band and/or the time window being characteristic of the occurrence of knocking signals.

If knocking has been detected, knock control is performed by the microprocessor integrated into the engine in such a way that a retardation angle is added to a fundamental firing angle, the sum forming the basic firing angle. The retardation angle is defined as a positive value in the sense of the present invention. A torque-based firing angle representing the earliest possible firing angle is calculated from the torque structure on the basis of the torque requirements. The basic firing angle and the torque-based firing angle are then compared in the method of calculating the firing angle, using the later of the two firing angles, i.e., the firing angle closer to top dead center (TDC) as the firing angle to be implemented. The fundamental firing angle is read out of a load-dependent and/or rotational speed-dependent engine characteristics map which contains firing angles under normal conditions and is stored in the microprocessor of the engine. It contains values for fundamental firing angles assigned to certain rotational speed ranges and/or load ranges. The rotational speed is determined by sensors which are preferably mounted on the crankshaft. The load, i.e., the relative air filling of the particular cylinder, is determined by the microprocessor on the basis of various operating parameters such as the rotational speed, torque demand and the measured values of the hot-film air-mass meter (HFM) and the intake manifold pressure sensor, the rate of recycled exhaust gas or the position of the throttle valve with the help of models and is made available for the determination of the fundamental firing angle. The relative air filling is defined as the ratio of the instantaneous air filling and the air filling under normal conditions for the particular cylinder. The firing angle is retarded due to the knock control until no more knocking occurs. The adjustment of the firing angle in the individual steps is added to a retardation angle which indicates the total adjustment of the firing angle based on the fundamental firing angle. If no knocking occurs over a certain period of time, then the firing angle is advanced again by the knock control system, i.e., the firing angle is at crankshaft angles farther before TDC. Accordingly, the retardation angle is reduced because of the firing angle having been advanced.

Adaptive knock control provides that the retardation angles are stored in an adaptive engine characteristics map, which is subdivided into various ranges for at least one operating parameter, or they are read out of this adaptive engine characteristics map. The adaptive engine characteristics map is stored in the microprocessor, which also controls the reading and storing of the retardation angles. An instantaneous retardation angle is preferably stored on leaving a range of the adaptive engine characteristics map when the instantaneous retardation angle is later by a certain applicable angle than the retardation angle stored previously for the range just departed. An earlier instantaneous retardation angle, in comparison with the retardation angle stored previously, may also be stored in the particular engine characteristics map range likewise on leaving a range of the adaptive engine characteristics map on the condition that the instantaneous retardation angle has already been used over a certain period of time. Under certain conditions, e.g., when switching to knock control with the adaptive engine characteristics map, the corresponding retardation angle is read out of the range of the adaptive engine characteristics map which includes the at least one instantaneous operating parameter. Likewise, a retardation angle is read out of the adaptive engine characteristics map when the value of at least one instantaneous operating parameter changes so that it falls in another range of the adaptive engine characteristics map. Then the retardation angle is read out of the other range of the adaptive engine characteristics map. In another exemplary embodiment, the retardation angle is read out of the other range of the adaptive engine characteristics map only when there is a dynamic change in at least one operating parameter, i.e., when the change in the at least one operating parameter in a certain period of time exceeds a certain applicable threshold value. The retardation angle read out of the adaptive engine characteristics map is used as the new instantaneous retardation angle in all the examples described.

There are already known engines having direct gasoline injection, whereby different operating modes are differentiated for the operation of such engines. Operating modes are operating states characterized by the status of important operating variables and/or basic model concepts. Within one mode of operation, the states of the operating variables are then variable only within certain limits. Important operating variables include, for example, the point in time of the injection, the number of injection operations, the quantity of fuel to be injected and thus also the fuel/air ratio $\lambda$, the firing angle retardation, or the firing angle. Basic model concepts may include the torque model or other models of nonmeasurable variables that may be used to calculate all the operating variables. The use of a certain model may be initiated, for example, independently of other parameters, e.g., when certain nonmeasurable external conditions are in effect. In another exemplary embodiment, the use of a certain model, e.g., for the torque or the processes in the intake manifold, may be initiated by the microprocessor if certain requirements exist and/or operating variables have certain values. For example, at high rotational speeds, use of the torque model for a homogeneous mixture having a fuel/air ratio of almost 1 prevailing in the combustion chamber forms the basis for the calculations when a high acceleration is also required due to the position of the gas pedal. If the rotational speeds are low and the dynamic power desired through the position of the gas pedal is low, a different torque model which is correct for a stratified mixture in the combustion chamber, for example, is used as the basis for calculation.

The following operating modes are differentiated and controlled by the microprocessor: homogeneous, homogeneous lean, stratified charge, homogeneous stratified charge, homogeneous antiknock, and stratified-charge catalytic converter heating. However, the invention presented here is not limited to the operating modes listed here, and the method and/or device may also be used similarly for other operating modes.

The following description of the operating modes is based on a four-stroke method, which is used predominantly for direct-gasoline-injection internal combustion engines. The four strokes are known as the intake stroke, the compression stroke, the working or combustion stroke, and the exhaust stroke, in that order.

In the homogeneous operating mode, fuel is injected once into the combustion chamber in the intake stroke, the amount of fuel injected being metered so the fuel/air ratio $\lambda$ is approx. 1. Fuel mixes with the air in the combustion chamber so that there is a uniform distribution of fuel. In this operating mode, a torque model different from the other operating modes mentioned here is used.

The homogeneous lean operating mode is the operating mode in which the fuel distribution in the combustion chamber is also uniform, but the fuel/air ratio achieved is significantly greater than 1.

This is achieved by injecting a much smaller amount of fuel into the combustion chamber in comparison with the homogeneous operating mode. Fuel is again injected once in the intake stroke.

In the stratified-charge operating mode, fuel is injected into the combustion chamber so late, i.e., in the compression stroke, that there is no longer a uniform distribution of, fuel. Thus, there is an ignitable cloud of fuel mixture only in proximity to the spark plug, i.e., there is: a stratified distribution of the fuel-air mixture.

The homogeneous stratified-charge operating mode is the operating mode in which fuel is injected in both the intake stroke and the compression stroke. With the first injection, a lean basic mixture distributed uniformly in the combustion chamber is produced, in which a rich, highly flammable stratified-charge cloud is deposited near the spark plug during the second injection. The flame produced by the rich mixture is able to spread into the lean basic mixture, so that it is also converted completely.

In the homogeneous antiknock operating mode, as in the homogeneous stratified charge operating mode, fuel is injected in the intake stroke and in the compression stroke, but the antiknock operating mode is used when the retardation angle of the firing angle achieved because of knocking has become too large and thus the loss of torque due to the large retardation angle has also become too great. The homogeneous antiknock operating mode achieves a reduction in the knocking tendency of the fuel/air mixture in the combustion chamber due to the cooling effect of the fuel injected later and due to the lean areas at the edges, so it is possible to reduce the retardation of the firing angle brought about by the knocking. This permits an improvement in efficiency.

The stratified charge catalytic converter heating operating mode is the operating mode in which fuel is injected into the combustion chamber in both the compression stroke and the combustion stroke. In particular the fuel injected in the second injection cycle is very late in burning and thus greatly heats up the exhaust gas line. Therefore, various parts of the catalytic converter quickly reach their operating temperature.

A first exemplary embodiment of the method and the device according to the present invention provides that different adaptive engine characteristics maps are stored in the microprocessor of the internal combustion engine for at least two of the operating modes mentioned above. The adaptive engine characteristics maps may differ in the values stored in the individual ranges of the adaptive engine characteristics map and in a different division and/or size of the ranges of the engine characteristics maps. For example, there is a first adaptive engine characteristics map for the homogeneous operating mode and a second adaptive engine characteristics map for the homogeneous lean operating mode. As it is possible to operate in the homogeneous operating mode in all load ranges and/or rotational speed ranges, the first adaptive engine characteristics map contains all the load ranges and/or rotational speed ranges. For example, the loads that occur are divided into four ranges and the rotational speeds that occur are divided into six ranges, so the resulting first adaptive engine characteristics map has 24 engine characteristics map ranges. The homogeneous lean operating mode, however, is used only at low loads and rotational speeds; for example, the second adaptive engine characteristics map includes only two load ranges, so that the second adaptive engine characteristics map has a total of 12 ranges which may also differ in size from the size of the adaptive engine characteristics maps of the first adaptive engine characteristics map. In another exemplary embodiment, the number of rotational speed ranges could also be modified, so the second adaptive engine characteristics map would include two load ranges and three rotational speed ranges, for example, which would yield a total of six ranges for the second adaptive engine characteristics map.

If the microprocessor changes the operating mode, e.g., from homogeneous lean to homogeneous because of a change in the torque demand, a higher rotational speed, a change in dynamics, etc., then in the device and/or the method according to the present invention, the instantaneous retardation value for determining the basic firing angle is read out of the first adaptive engine characteristics map for the new, operating mode. The retardation value is read out of the range of the first adaptive engine characteristics map which corresponds to the instantaneous load and the instantaneous rotational speed. The retardation value achieved in the homogeneous lean operating mode is not used. Accordingly, in switching to another operating mode, the retardation value is read out of the range of the adaptive engine characteristics map of the other operating mode which corresponds to the instantaneous operating parameters.

In another exemplary embodiment of the present invention, the adaptive engine characteristics maps are provided on an individual basis for each cylinder, so there is a separate adaptive engine characteristics map for each cylinder and each operating mode. Thus, the given facts for each individual cylinder may be taken into account optimally. The particular instantaneous cylinder is determined with the help of camshaft sensors and/or crankshaft sensors, and the cylinder identification contained in the microprocessor is determined.

In another exemplary embodiment of the present invention, instead of an adaptive engine characteristics map, a computation specification may also be made available for each operating mode so that the retardation angle may be calculated. The calculation is performed by the microprocessor of the internal combustion engine. The computation specification may be adapted, for example, by adapting the parameters of the particular computation specification used as a function of the instantaneous retardation angles. Like the adaptive engine characteristics map, the computation specification depends on operating parameters such as the load and/or rotational speed. In another exemplary embodiment, as in the above exemplary embodiment, the computation specification of the new operating mode is used to calculate the retardation angle after a change from an old operating mode to a new operating mode. In another exemplary embodiment, the computation specification may additionally be implemented individually for each cylinder in the microprocessor of the internal combustion engine.

Providing different adaptive engine characteristics maps or computation specifications for different operating modes ensures that for each operating mode there is an adaptive engine characteristics map adapted to the corresponding conditions, so it is possible to minimize the number of overwrite operations. In addition, unnecessary knocking is prevented, because the "correct" retardation value may always be set already when there is a change in operating mode.

What is claimed is:

1. A method of adaptive knock control of a direct-gasoline-injection internal-combustion engine, comprising:
    operating the engine in at least two of homogeneous operating mode, homogeneous lean operating mode, stratified-charge operating mode, homogeneous stratified-charge operating mode, homogeneous antiknock operating mode, and catalytic converter heating operating mode, wherein;
        in the homogeneous operating mode, fuel is injected once into a combustion chamber in an intake stroke, an amount of fuel injected being metered so that the fuel/air ratio $\lambda$ is approximately 1;
        in the homogeneous lean operating mode, fuel is injected once into a combustion chamber in an intake stroke, an amount of fuel injected being metered so that the fuel/air ratio achieved is significantly greater than 1;
        in the homogeneous stratified-charge operating mode, fuel is injected into the combustion chamber in a compression stroke so that there is no uniform distribution of fuel;
        in the homogeneous stratified-charge operating mode, fuel is injected in both the intake stroke and the compression stroke, so that with a first injection a lean basic mixture distributed uniformly in the combustion chamber is produced, and during a second injection a rich, highly flammable stratified-charge cloud is deposited near a spark plug;
        in the homogeneous antiknock operating mode, fuel is injected in the intake stroke and in the compression stroke, and a retardation angle of a firing angle achieved because of knocking has exceeded a predetermined threshold;
        in the catalytic converter heating operating mode, fuel is injected into the combustion chamber in both the compression stroke and a combustion stroke;
    determining a retardation angle of a firing angle for knock control using one of an adaptable computation specification and an adaptive engine characteristics map, the adaptive characteristics map being subdivided into a plurality of ranges for at least one operating parameter, each of the plurality of ranges being assigned with a corresponding retardation angle, wherein one of a separate, dedicated adaptive engine characteristics map and a separate, dedicated adaptable computation specification is provided for each of the at least two operating modes;
    performing, in response to a change in the operating mode to a new operating mode, one of reading an instantaneous retardation angle from a corresponding adaptive engine characteristics map for the new operating mode and calculating an instantaneous retardation angle using a corresponding adaptive computation specification for the new operating mode; and
    one of storing retardation angles in the corresponding adaptive engine characteristics map and adapting the corresponding adaptive computation specification as a function of knocking of the internal combustion engine.

2. The method according to claim 1, wherein at least one of the adaptive engine characteristics maps and the adaptable computation specifications for the at least two operating modes is further differentiated according to individual cylinders of the internal combustion engine.

3. The method according to claim 1, wherein an instantaneous retardation angle is stored upon exceeding a range of the corresponding adaptation engine characteristics map, if the instantaneous retardation angle is later by a predetermined angle than a retardation angle stored previously for the range that has been exceeded.

4. The method of claim 1, wherein an instantaneous retardation angle that is earlier in comparison with a retardation angle stored previously is stored, if the instantaneous retardation angle has already been used over a predetermined period of time.

5. A device for adaptive knock control of a direct-gasoline-injection internal-combustion engine, comprising:

an arrangement for controlling the engine operating in at least two of homogeneous operating mode, homogeneous lean operating mode, stratified-charge operating mode, homogeneous stratified-charge operating mode, homogeneous antiknock operating mode, and catalytic converter heating operating mode, wherein;

in the homogeneous operating mode, fuel is injected once into a combustion chamber in an intake stroke, an amount of fuel injected being metered so that the fuel/air ratio $\lambda$ is approximately 1;

in the homogeneous lean operating mode, fuel is injected once into a combustion chamber in an intake stroke, an amount of fuel injected being metered so that the fuel/air ratio achieved is significantly greater than 1;

in the homogeneous stratified-charge operating mode, fuel is injected into the combustion chamber in a compression stroke so that there is no uniform distribution of fuel;

in the homogeneous stratified-charge operating mode, fuel is injected in both the intake stroke and the compression stroke, so that with a first injection a lean basic mixture distributed uniformly in the combustion chamber is produced, and during a second injection a rich, highly flammable stratified-charge cloud is deposited near a spark plug;

in the homogeneous antiknock operating mode, fuel is injected in the intake stroke and in the compression stroke, and a retardation angle of a firing angle achieved because of knocking has exceeded a predetermined threshold;

in the catalytic converter heating operating mode, fuel is injected into the combustion chamber in both the compression stroke and a combustion stroke;

an arrangement for determining a retardation angle of a firing angle for knock control using one of an adaptable computation specification and an adaptive engine characteristics map, the adaptive characteristics map being subdivided into a plurality of ranges for at least one operating parameter, each of the plurality of ranges being assigned with a corresponding retardation angle, wherein one of a separate, dedicated adaptive engine characteristics map and a separate, dedicated adaptable computation specification is provided for each of the at least two operating modes;

an arrangement for performing, in response to a change in the operating mode to a new operating mode, one of reading an instantaneous retardation angle from a corresponding adaptive engine characteristics map for the new operating mode and calculating an instantaneous retardation angle using a corresponding adaptive computation specification for the new operating mode; and an arrangement for one of storing retardation angles in the corresponding adaptive engine characteristics map and adapting the corresponding adaptive computation specification as a function of knocking of the internal combustion engine.

6. The device according to claim 5, wherein at least one of the adaptive engine characteristics maps and the adaptable computation specifications for the at least two operating modes is further differentiated according to individual cylinders of the internal combustion engine.

7. The device according to claim 5, wherein an instantaneous retardation angle is stored upon exceeding a range of the corresponding adaptation engine characteristics map, if the instantaneous retardation angle is later by a predetermined angle than a retardation angle stored previously for the range that has been exceeded.

8. The device according to claim 5, wherein an instantaneous retardation angle that is earlier in comparison with a retardation angle stored previously is stored, if the instantaneous retardation angle has already been used over a predetermined period of time.

* * * * *